(12) United States Patent
Furutani et al.

(10) Patent No.: US 8,422,972 B2
(45) Date of Patent: Apr. 16, 2013

(54) ANTENNA COMBINING MODULE

(75) Inventors: Koji Furutani, Nagaokakyo (JP); Yuji Takematsu, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 110 days.

(21) Appl. No.: 13/191,643

(22) Filed: Jul. 27, 2011

(65) Prior Publication Data

US 2011/0281540 A1 Nov. 17, 2011

Related U.S. Application Data

(63) Continuation of application No. PCT/JP2010/050898, filed on Jan. 25, 2010.

(30) Foreign Application Priority Data

Jan. 28, 2009 (JP) ................................ 2009-016088

(51) Int. Cl.
*H04B 1/06* (2006.01)

(52) U.S. Cl.
USPC ........................................... 455/269; 455/82

(58) Field of Classification Search .... 455/276.1–278.1, 455/82–83, 19, 269, 273, 274, 562.1, 575.7, 455/107, 121, 129; 343/700 MS, 702, 725
See application file for complete search history.

(56) References Cited

U.S. PATENT DOCUMENTS

| | | | |
|---|---|---|---|
| 6,172,646 B1 * | 1/2001 | Kawahata et al. | 455/575.7 |
| 7,091,917 B2 * | 8/2006 | Jan et al. | 455/269 |
| 8,009,101 B2 * | 8/2011 | Ikemoto et al. | 455/82 |
| 2003/0085777 A1 | 5/2003 | Kim et al. | |
| 2004/0203552 A1 | 10/2004 | Horiuchi et al. | |
| 2005/0248487 A1 * | 11/2005 | Okado | 343/700 MS |
| 2009/0167614 A1 * | 7/2009 | Takaki et al. | 343/702 |

FOREIGN PATENT DOCUMENTS

| | | |
|---|---|---|
| EP | 1 758 247 A2 | 2/2007 |
| JP | 2003-152492 A | 5/2003 |
| JP | 2004-297456 A | 10/2004 |
| JP | 2005-210607 A | 8/2005 |
| JP | 2007-060411 A | 3/2007 |
| JP | 2007-151123 A | 6/2007 |
| WO | 2008/029641 A1 | 3/2008 |

OTHER PUBLICATIONS

Official Communication issued in International Patent Application No. PCT/JP2010/050898, mailed on Mar. 9, 2010.
Official Communication issued in corresponding Japanese Patent Application No. 2010-548493, mailed on Jul. 31, 2012.

* cited by examiner

*Primary Examiner* — Lana N Le
(74) *Attorney, Agent, or Firm* — Keating & Bennett, LLP

(57) ABSTRACT

In an antenna combining module, coupling of an inductor and individual signal lines provided in a matching circuit is prevented and minimized and isolation of lines from one another and communication performance are improved. The antenna combining module includes a duplexer DUP and a multilayer substrate. The multilayer substrate includes a reception signal line, a transmission signal line, an antenna common line, a matching line and a ground line. A wiring electrode for an inductor is inserted into the matching line from the mounting electrode for grounding up to the position where it combines with the antenna common line. The wiring electrode for the inductor wraps around the outside of a via hole filled with a conductive material of the antenna common line. The ground line is arranged between the wiring electrode for the inductor and the reception signal line, and the transmission signal line.

7 Claims, 2 Drawing Sheets

ANTENNA COMBINING MODULE

BACKGROUND OF THE INVENTION

1. Field of the Invention

The present invention relates to antenna combining modules in which a diplexer, a duplexer, a switch or the like is provided in a multilayer substrate.

2. Description of the Related Art

An antenna combining module, which performs conversion between a common antenna signal and a plurality of individual signals, is employed in the front end section of mobile telephones and the like. Examples of antenna combining modules include an antenna combining module that is equipped with a multilayer substrate, and a mounting electrode for a common antenna signal and mounting electrodes for individual signals disposed on a mounting surface of the multilayer substrate. In this type of antenna combining module, sometimes a matching circuit is connected to an antenna common line through which a common antenna signal flows and an inductor of the matching circuit is formed inside the multilayer substrate (for example, refer to Japanese Unexamined Patent Application Publication No. 2007-060411).

In this antenna combining module, there are cases where, since the individual signal lines through which individual signals flow and the inductor of the matching circuit are arranged inside the multilayer substrate, coupling easily occurs between the individual signal lines and the inductor of the matching circuit, and the communication performance is reduced in terms of, for example, the reception sensitivity as a result of the isolation of individual lines being degraded.

SUMMARY OF THE INVENTION

Accordingly, preferred embodiments of the present invention provide an antenna combining module that minimizes and prevents coupling between individual signal lines and an inductor provided in a matching circuit inside a multilayer substrate and improves the isolation of lines and communication performance.

According to a preferred embodiment of the present invention, an antenna combining module performs conversion between a common antenna signal and a plurality of individual signals and includes a plurality of individual signal lines, an antenna common line, a ground line and an inductance element. Individual signals pass through the individual signal lines. A common antenna signal passes through the antenna common line. The ground line is at ground potential. The inductance element grounds the antenna common line. The individual signal lines, the antenna common line and the inductance element are preferably defined by wiring electrodes provided on a substrate surface and/or at a substrate interface and by via electrodes provided inside a substrate. One end of the inductance element is connected to a grounding mounting electrode that is provided on one main surface of a substrate and the inductance element is arranged so as to wrap around a via electrode that is included in the antenna common line. The ground line is arranged between the individual signal lines and the antenna common line and the inductance element.

In the antenna combining module, the inductance element is arranged so as to be separated from the individual signal lines by the ground line and therefore the isolation of the inductance element and the individual signal lines from one another can be improved. Furthermore, the inductance element is arranged so as to wrap around the outside of the via hole of the antenna common line and therefore the isolation of the antenna common line and the individual signal lines from one another can also be improved. As a result, communication performance in terms of, for example, reception sensitivity is improved. Furthermore, since the via hole of the antenna common line passes through the region in which the inductance element is located, the space taken up by wiring of the antenna common line is reduced and reduction of the size of the module can be advanced.

In the antenna module according to a preferred embodiment of the present invention, it is preferable that the mounting electrode for grounding be arranged between a mounting electrode that is in conductive contact with the antenna common line and mounting electrodes that are in conductive contact with the individual signal lines. Thus, the isolation of the inductance element and the individual signal lines from each other and the isolation of the antenna common line and the individual signal lines from each other can be further improved.

The antenna combining module according to a preferred embodiment of the present invention may also include an antenna duplexer. The antenna duplexer includes individual signal terminals and an antenna common terminal and performs conversion between the plurality of individual signals and the common antenna signal. The individual signal terminals are connected to surface electrodes that are in conductive contact with the individual signal lines among surface electrodes located on the other main surface of the substrate. The antenna common terminal is connected to a surface electrode that is in conductive contact with the antenna common line.

In the antenna combining module according to a preferred embodiment of the present invention, it is preferable that the surface electrode for grounding be arranged between a surface electrode that is in conductive contact with the antenna common line and surface electrodes that are in conductive contact with the individual signal lines. Thus, the isolation of the inductance element and the individual signal lines from each other and the isolation of the antenna common line and the individual signal lines from each other can be further improved.

It is preferable that the mounting electrode for grounding and the surface electrode for grounding of the present invention be connected to each other through a via hole filled with a conductive material. Thus, the isolation of the inductance element and the individual signal lines from each other and the isolation of the antenna common line and the individual signal lines from each other can be further improved.

It is preferable that the antenna common line according to a preferred embodiment of the present invention be connected between the mounting electrode and the surface electrode by only the via hole. By structuring the antenna combining module in this way, signal loss generated in the antenna common line can be reduced.

The antenna duplexer according to a preferred embodiment of the present invention is preferably a surface acoustic wave type antenna duplexer that includes a terminal for grounding that is connected to the surface electrode for grounding. As a result, the isolation of the matching line and the individual signal lines from each other and the isolation of the antenna common line and the individual signal lines from each other can be further improved.

According to a preferred embodiment of the present invention, the ground line is arranged between the patterned electrode for the inductor and the individual signal lines, and the patterned electrode for the inductor wraps around the outside of the via hole for the antenna line. As a result, the isolation of the respective lines from one another can be improved. Thus, communication performance in terms of for example reception sensitivity can be improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1A:
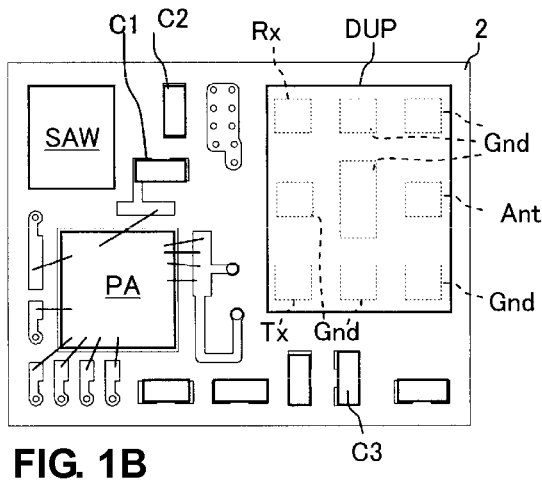
FIGS. 1A-1C are diagrams for explaining an example configuration of an antenna combining module according to a preferred embodiment of the present invention.
Figure 1B:
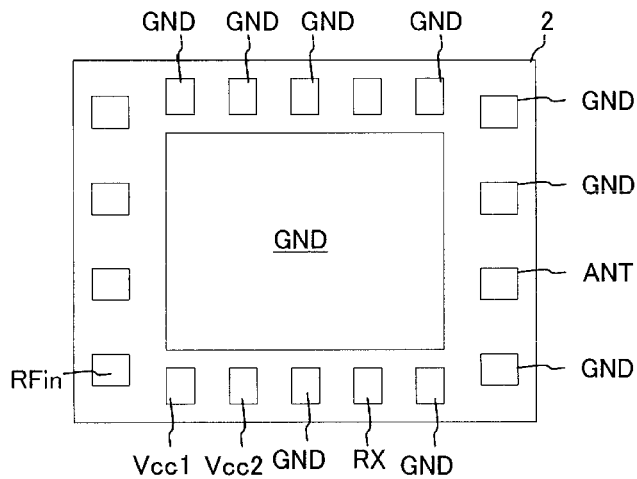
Figure 1C:
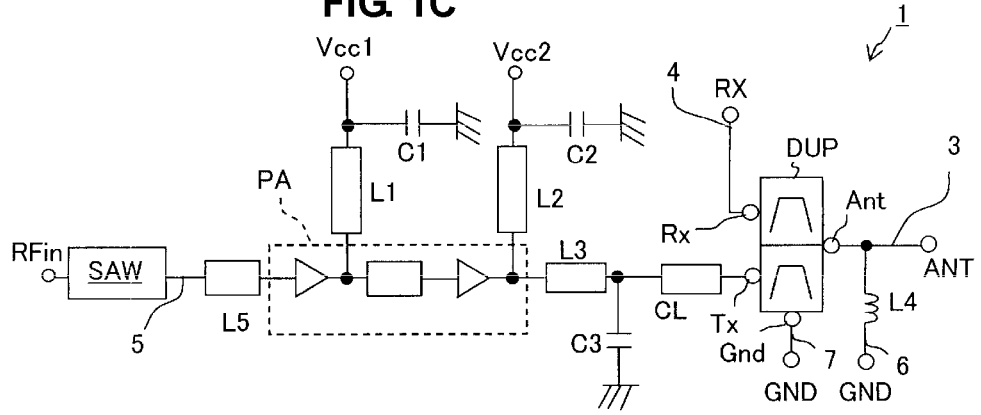

FIGS. 1A-1C are diagrams for explaining an example configuration of an antenna combining module according to a preferred embodiment of the present invention. FIG. 1A is a top surface view in which the antenna combining module is viewed in plan, FIG. 1B is a bottom surface view in which the antenna combining module is viewed in plan, and FIG. 1C is a rough equivalent circuit diagram of the antenna combining module.

An antenna combining module 1 includes a multilayer substrate 2 formed by stacking a plurality of substrates on top of one another. The top surface of the multilayer substrate 2 is a chip mounting surface and is provided with a plurality of surface electrodes that are used to mount discrete components. The bottom surface of the multilayer substrate 2 is a module mounting surface and is provided with a plurality of mounting electrodes that serve as external connection ports of the antenna combining module 1. The surface electrodes and the mounting electrodes are connected to one another through wiring electrodes and via electrodes provided inside the multilayer substrate 2.

The equivalent circuit of the antenna combining module 1 includes an antenna common line 3, a reception signal line 4, a transmission signal line 5, a matching line 6 and a ground line 7. The reception signal line 4 and the transmission signal line 5 correspond to individual signal lines according to a preferred embodiment of the present invention. The equivalent circuit further includes a duplexer DUP, a power amplifier PA, a surface acoustic wave filter SAW, inductors L1 to L5 and CL, and capacitors C1 to C3, as circuit elements. The equivalent circuit further includes an antenna port ANT, a reception port RX, a transmission port RFin, ground ports GND and power supply ports Vcc1 and Vcc2, as external connection ports.

The duplexer DUP is a discrete component which is an antenna duplexer that includes a surface acoustic wave resonator provided with an IDT electrode and corresponds to an antenna duplexer according to a preferred embodiment of the present invention. The duplexer DUP is provided with a transmission filter and a reception filter and performs conversion between a reception signal and a transmission signal, which correspond to the individual signals, and a common antenna signal. An antenna common terminal Ant, a reception signal terminal Rx, a transmission signal terminal Tx and a ground terminal Gnd, which are illustrated by dashed lines in FIG. 1A, are provided on the bottom surface of the duplexer DUP. The reception signal terminal Rx and the transmission signal terminal Tx correspond to individual signal terminals according to a preferred embodiment of the present invention. These terminals are connected to the surface electrodes of the multilayer substrate 2 through solder or the like.

The antenna common line 3 is a line that connects the surface electrode on which the antenna common terminal Ant of the duplexer DUP is mounted and a mounting electrode, which serves as the antenna port ANT.

The matching line 6 is a line that branches from the antenna common line 3 and is connected to a mounting electrode that serves as a ground port GND. The inductor L4 is inserted into the matching line 6. The inductor L4 corresponds to an inductance element according to a preferred embodiment of the present invention and is a circuit element that includes a wiring electrode disposed between layers of the multilayer substrate 2 and a via electrode disposed within a layer.

The reception signal line 4 is a line that connects the surface electrode on which the reception signal terminal Rx of the duplexer DUP is mounted and a mounting electrode that serves as the antenna port ANT.

The ground line 7 is a line that connects the surface electrodes on which the ground terminals Gnd of the duplexer DUP are mounted and mounting electrodes that serve as the ground ports GND.

The transmission signal line 5 is a line that connects the surface electrode on which the transmission signal terminal Tx of the duplexer DUP is mounted and a mounting electrode that serves as the transmission port RFin. The surface acoustic wave filter SAW, the inductor L5, the power amplifier PA, the inductor L3 and the inductor CL are inserted into the transmission signal line 5. Furthermore, the connection point between the inductor CL and the inductor L3 is grounded through the capacitor C3 arranged in parallel therewith.

The surface acoustic wave filter SAW removes out-of-band noise from a transmission signal input from the transmission port RFin. The inductor L5 performs matching between the surface acoustic wave filter SAW and the power amplifier PA. The power amplifier PA amplifies the transmission signal. The inductor L3 and the capacitor C3 perform matching between the power amplifier PA and a coupler CPL. The coupler CPL includes a coupling line inserted into the transmission signal line 5 and a coupling line inserted into a monitor line. A portion of the electrical power of the transmission signal passing through the transmission signal line 5 is extracted from the monitor line by the coupler CPL. The capacitors C1, C2 and C3, which are circuit elements, are mounted on the chip mounting surface of the multilayer substrate 2 as discrete components.

Electrical power is supplied to the power amplifier PA from a first power supply line, which is connected to the mounting electrode that serves as the power supply port Vcc1, and a second power supply line, which is connected to the mounting electrode that serves as the power supply port Vcc2. The inductor L1 (or the inductor L2) is inserted into the respective power supply line and is grounded through the capacitor C1 (or the capacitor C2) arranged in parallel therewith, whereby matching is achieved between the power supply port Vcc1 (or the power supply port Vcc2) and the power amplifier PA.

Figure 2A:
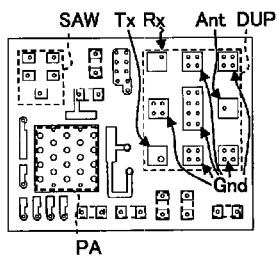
FIGS. 2A-2K are layered views of a multilayer substrate of the antenna combining module of FIG. 1.
Figure 2E:
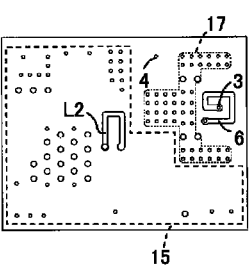
Figure 2I:
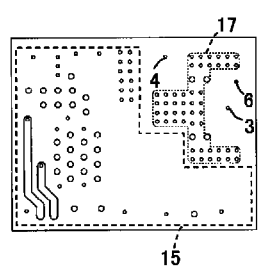
Figure 2B:
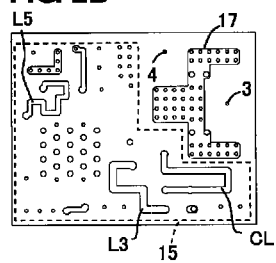
Figure 2F:
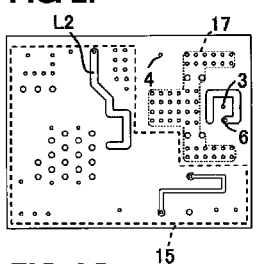
Figure 2J:
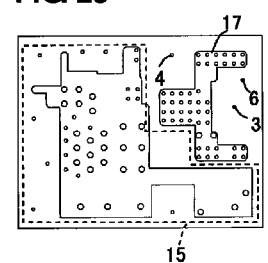
Figure 2C:
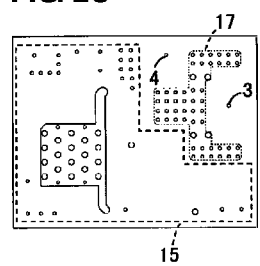
Figure 2G:
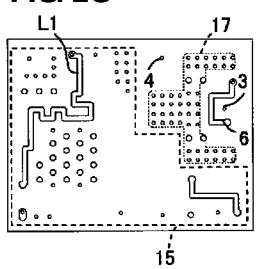
Figure 2K:
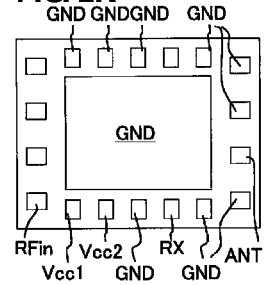
Figure 2D:
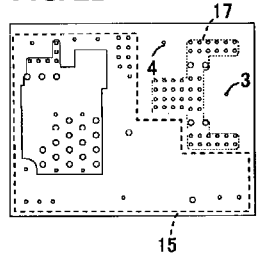
Figure 2H:
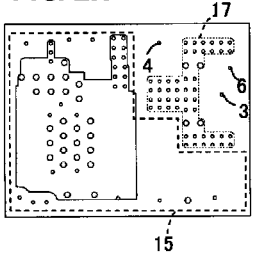

FIGS. 2A-2K are layered views of the multilayer substrate 2. FIGS. 2A to 2J are plan views in which substrates A to J are viewed in plan from the uppermost layer to the lowermost layer in order. Furthermore, FIG. 2K is a plan view in which the bottom surface of the lowermost layer of the multilayer substrate 2 is viewed in plan. The via holes in the substrates A to J are illustrated by round marks in the figures.

The substrate A is stacked as the uppermost layer in the multilayer substrate 2 and the surface electrodes for mounting discrete components are provided on the surface thereof.

Dashed lines in the figure illustrate the outlines of the discrete components mounted on the surface electrodes and arrows in the figure illustrate terminals of the duplexer mounted on the surface electrodes.

The substrate B is stacked as the second layer of the multilayer substrate 2 from the chip mounting surface. A via electrode of the antenna common line 3 is formed at a position surrounded by a ground region 17 and an edge of the substrate. A via electrode of the reception signal line 4 is disposed between the ground region 17 and a transmission signal region 15. A patterned electrode of the ground line 7, which is an inner layer ground, is provided on the upper surface of the ground region 17 and via electrodes of the ground line 7, which is at the ground potential, are densely arranged inside the substrate within the ground region 17. The transmission signal region 15 is a region in which via electrodes and patterned electrodes of the transmission signal line 5 are located and a patterned electrode that will be the inductor L3, a patterned electrode that will be the inductor CL, and a patterned electrode that will be the inductor L5 are located in this region.

The substrate C is stacked as the third layer of the multilayer substrate 2 from the chip mounting surface. A via electrode of the antenna common line 3 is located at a position surrounded by the ground region 17 and an edge of the substrate. A via electrode of the reception signal line 4 is located between the ground region 17 and the transmission signal region 15. Via electrodes of the ground line 7, which is at the ground potential, are densely arranged inside the substrate within the ground region 17. The via holes and patterned electrodes of the transmission signal line 5 are located in the transmission signal region 15.

The substrate D is stacked as the fourth layer of the multilayer substrate 2 from the chip mounting surface. A via electrode of the antenna common line 3 is located at a position surrounded by the ground region 17 and an edge of the substrate. A via electrode of the reception signal line 4 is disposed between the ground region 17 and the transmission signal region 15. Via electrodes of the ground line 7, which is at the ground potential, are densely arranged inside the substrate within the ground region 17. Via electrodes and patterned electrodes of the transmission signal line 5 are located in the transmission signal region 15.

The substrate E is stacked as the fifth layer of the multilayer substrate 2 from the chip mounting surface. A via electrode of the antenna common line 3 and a wiring electrode and via electrode, which will be included in the inductor L4 of the matching line 6, are located at positions surrounded by the ground region 17 and an edge of the substrate. A via electrode of the reception signal line 4 is disposed between the ground region 17 and the transmission signal region 15. Via electrodes of the ground line 7, which is at the ground potential, are densely arranged inside the substrate within the ground region 17. The transmission signal region 15 is a region in which via electrodes and patterned electrodes of the transmission signal line 5 are provided and a patterned electrode, which will be included in the inductor L2, is located in this region.

The substrate F is stacked as the sixth layer of the multilayer substrate 2 from the chip mounting surface. A via electrode of the antenna common line 3 and a wiring electrode and via electrode, which will be included in the inductor L4 of the matching line 6, are located at positions surrounded by the ground region 17 and an edge of the substrate. A via electrode of the reception signal line 4 is disposed between the ground region 17 and the transmission signal region 15. Via electrodes of the ground line 7, which is at the ground potential, are densely arranged inside the substrate within the ground region 17. The transmission signal region 15 is a region in which via electrodes and patterned electrodes of the transmission signal line 5 are provided and a patterned electrode, which will be included in the inductor L2, is located in this region.

The substrate G is stacked as the seventh layer of the multilayer substrate 2 from the chip mounting surface. A via electrode of the antenna common line 3 and a wiring electrode and via electrode, which will be included in the inductor L4 of the matching line 6, are located at positions surrounded by the ground region 17 and an edge of the substrate. A via electrode of the reception signal line 4 is disposed between the ground region 17 and the transmission signal region 15. Via electrodes of the ground line 7, which is at the ground potential, are densely arranged inside the substrate within the ground region 17. The transmission signal region 15 is a region in which via electrodes and patterned electrodes of the transmission signal line 5 are located and a patterned electrode, which will define the inductor L1, is located in this region.

The substrate H is stacked as the eighth layer of the multilayer substrate 2 from the chip mounting surface. A via electrode of the antenna common line 3 and a via electrode of the matching line 6 are located at positions surrounded by the ground region 17 and an edge of the substrate. A via electrode of the reception signal line 4 is disposed between the ground region 17 and the transmission signal region 15. Via electrodes of the ground line 7, which is at the ground potential, are densely arranged inside the substrate within the ground region 17. Via electrodes and patterned electrodes of the transmission signal line 5 are located in the transmission signal region 15.

The substrate I is stacked as the ninth layer of the multilayer substrate 2 from the chip mounting surface. A via electrode of the antenna common line 3 and a via electrode of the matching line 6 are located at positions surrounded by the ground region 17 and an edge of the substrate. A via electrode of the reception signal line 4 is disposed between the ground region 17 and the transmission signal region 15. Via electrodes of the ground line 7, which is at the ground potential, are densely arranged inside the substrate within the ground region 17. Via electrodes and patterned electrodes of the transmission signal line 5 are located in the transmission signal region 15.

The substrate J is stacked as the tenth layer of the multilayer substrate 2 from the chip mounting surface. A via electrode of the antenna common line 3 and a via electrode of the matching line 6 are located at positions surrounded by the ground region 17 and an edge of the substrate. A via electrode of the reception signal line 4 is disposed between the ground region 17 and the transmission signal region 15. A patterned electrode of the ground line 7, which is an inner layer ground, is provided on the upper surface of the ground region 17 and via electrodes of the ground line 7, which is at the ground potential, are densely arranged inside the substrate within the ground region 17. Via electrodes and patterned electrodes of the transmission signal line 5 are located in the transmission signal region 15. A plurality of mounting electrodes, which are illustrated in FIG. 2K, are located on the bottom surface of the substrate (J).

Here, the matching line 6 is arranged such that wiring electrodes of the substrates (E) to (G) wrap around the via holes of the antenna common line 3 and so as to connect only the via holes of the substrates (H) to (J). Therefore, the space occupied by wiring of the antenna common line 3 can be reduced. Furthermore, leakage of a signal from the antenna common line 3 can be prevented and minimized. In addition, the ground line 7 is provided in the ground region 17 and the ground region 17 is arranged between the matching line 6 and the antenna common line 3, and the transmission signal line 5 and the reception signal line 4 such that the ground line is connected from the surface electrodes to the mounting electrodes by the shortest distance through the via holes. Therefore, inside the multilayer substrate 2, a space is arranged between the matching line 6 and the antenna common line 3, and the transmission signal line 5 and the reception signal line 4 with the ground potential interposed between these lines, and coupling beyond the ground region 17 substantially does not occur. Therefore, isolation of the matching line 6 and the antenna common line 3 from the transmission signal line 5 and the reception signal line 4 can be improved.

Furthermore, among the surface electrodes provided on the chip mounting surface of the multilayer substrate 2 illustrated in FIG. 2A, the surface electrode connected to the antenna common terminal Ant of the duplexer DUP is surrounded by the surface electrodes connected to the ground terminals Gnd. Among the mounting electrodes provided on the module mounting surface of the multilayer substrate 2 illustrated in FIG. 2K, the mounting electrode that serves as the antenna port ANT is surrounded by the mounting electrodes that serve as the ground ports GND. Therefore, leakage of signals from the surface electrodes and mounting electrodes can be prevented and minimized and the isolation of the lines from one another can be further improved.

In the above-described preferred embodiment, an example in which a duplexer serves as an antenna combiner has been described, but the present invention can be applied to multiplexers such as diplexers and switchplexers, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna combining module that performs conversion between a common antenna signal and a plurality of individual signals, comprising:
    a plurality of individual signal lines through which respective individual signals pass;
    an antenna common line through which the common antenna signal passes;
    a ground line that is at ground potential; and
    an inductance element that grounds the antenna common line; wherein
    the individual signal lines, the antenna common line and the inductance element are defined by wiring electrodes provided on a substrate surface and/or a substrate interface and by via electrodes located inside a substrate;
    one end of the inductance element is connected to a grounding mounting electrode that is located on one main surface of the substrate and the inductance element is arranged so as to wrap around a via electrode included in the antenna common line; and
    the ground line is arranged between the individual signal lines and the antenna common line and the inductance element.

2. The antenna combining module according to claim 1, wherein the grounding mounting electrode is arranged between a mounting electrode that is in conductive contact with the antenna common line and mounting electrodes that are in conductive contact with the individual signal lines.

3. The antenna combining module according to claim 1, further comprising:
    an antenna combiner that performs conversion between the plurality of individual signals and the common antenna signal; wherein
    a plurality of surface electrodes are located on another main surface of the substrate that opposes the one main surface of the substrate; and
    the antenna combiner includes individual signal terminals connected to surface electrodes in conductive contact with the individual signal lines and an antenna common terminal connected to a surface electrode in conductive contact with the antenna common line, among the plurality of surface electrodes.

4. The antenna combining module according to claim 3, wherein the surface electrode for grounding is arranged between a surface electrode that is in conductive contact with the antenna common line and surface electrodes that are in conductive contact with the individual signal lines.

5. The antenna combining module according to claim 4, wherein the grounding mounting electrode and the surface electrode for grounding are connected to each other through a via electrode.

6. The antenna combining module according to claim 3, wherein the antenna common line is connected between the grounding mounting electrode and one of the surface electrodes by only a via electrode.

7. The antenna combining module according to claim 3, wherein the antenna combiner is a surface acoustic wave type antenna combiner that includes a terminal for grounding that is connected to the surface electrode for grounding.

* * * * *